United States Patent Office 3,813,353
Patented May 28, 1974

3,813,353
PREPARATION OF ION EXCHANGE RESINS
FROM ACROLEIN COPOLYMERS
David H. Clemens, Willow Grove, Pa., and Raymond J. Lange, Wheelersburg, Ohio, assignors to Rohm and Haas Company, Philadelphia, Pa.
No Drawing. Filed Feb. 5, 1973, Ser. No. 329,932
Int. Cl. C08f 27/08
U.S. Cl. 260—2.1 C                14 Claims

ABSTRACT OF THE DISCLOSURE

Weak base anion exchange resins are prepared by the Wallach reaction on poly(acrolein:divinylbenzene). The crosslinked polyacrolein is subjected to reaction with a secondary amine and formic acid to convert the aldehyde groups to the tertiary amine form. The resulting weak base anion exchange resins have good anion exchange capacities, good physical stability, good rinse requirements and resistance to oxidation. Strong base anion exchange resins are prepared by reaction of the tertiary amine product with a suitable alkyl halide or equilvalent material. These resins show excellent thermal stability and resistance to organic fouling.

---

This invention relates to strong base and weak base anion exchange resins and to their preparation and use. The strong base resins of this invention have a predominately aliphatic structure and contain substantial amounts of recurring units of the structure I where $R^1$, $R^2$ and $R^3$ are hydrogen, lower alkyl or hydroxy lower alkyl, $R^4$ is H— or $CH_3$— and $X^\ominus$ is any anion.

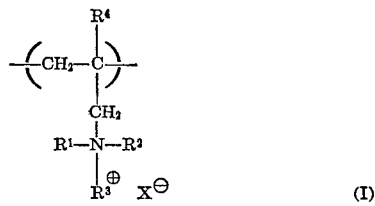

(I)

The weak base resins of this invention also have a predominately aliphatic structure and contain substantial amounts of recurring units of the structure II where $R^1$ and $R^2$ are hydrogen, lower alkyl, or hydroxy lower alkyl and $R^4$ is H— or $CH_3$—.

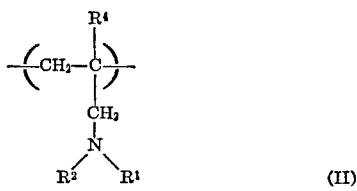

(II)

The weak base resins of this invention may preferably be prepared by a two step series of reactions involving copolymerization of acrolein or methacrolein with one or more crosslinking agents to produce a crosslinked, aldehyde-containing resin. The aldehyde containing resins are reacted with ammonia or an amine and formic acid to produce the weak base resin. The weak base resin is reacted with an alkyl halide or other alkylating agent to produce the strong base resin. Both the weak and strong base resin are prepared from crosslinked polyacrolein (or polymethacrolein) in which the acrolein or methacrolein units or mers are present in a major amount by weight.

The copolymerization step may be performed at temperatures ranging from about 0° C. to about 150° C. or higher by any of the well-known polymerization techniques such as bulk or emulsion polymerization. In a preferred embodiment this step is carried out by copolymerization of the acrolein or methacrolein witth the crosslinking agent or agents using the procedure of suspension polymerization. In this procedure acrolein or methacrolein, the crosslinking agent and a free radical generating catalyst are mixed and suspended by agitation in an aqueous medium, preferably a brine or salt solution to repress the water solubility of the monomers.

A suspending agent is usually used to assist in the formation of the suspension and to stabilize the formed suspension. Many water soluble polymeric materials may be used for this purpose and they may be either anionic, cationic or neutral. Examples are sodium polyacrylate, polyacrylamide and polyvinylimidazoline bisulfate. Alternatively, clays and other finely divided solids may be useful.

The suspension is then heated to activate the free radical generating catalyst and to produce the crosslinked aldehyde functional polymer as small beads or pearls. A variety of free radical generating catalysts may be used. These catalysts include organic peroxidic agents typified by oxonides, peroxides such as acetyl peroxide, lauroyl peroxide, stearoyl peroxide, tert.-butyl hydroperoxide, benzoyl peroxide, tert.-butyl perbenzoate, di tert.-butyl peroxide and the barium salt of tert.-butyl hydroperoxide, inorganic agents such as barium peroxide, sodium peroxide, hydrogen peroxide and the so-called "per" salts such as the water-soluble perborates, persulfates and perchlorates. Organic azo compounds such as azobisisobutyronitrile and its homologs are also useful. The catalysts are employed in suitable amounts ranging from about 0.1% to about 5.0% based on the weight of the monomeric material to be polymerized.

The crosslinking agent will generally be a polyunsaturated monomer containing a plurality of non-conjugated $CH_2=C<$ groups. Suitable polyunsaturated crosslinking agents include divinylbenzene, divinylpyridine, divinyltoluenes, divinylnaphthalenes, diallyl phthalate, ethylene glycol diacrylate, ethylene glycol dimethacrylate, trimethylolpropane trimethacrylate, pentaerythritol tetramethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silcate, triallyl tricarballylate, triallyl aconitate, triallyl citrate, triallyl phosphate, N,N'-ethylenedicrylamide, trivinylbenzene, trivinylnaphthalene, polyvinylanthracenes and the polyallyl and polyvinyl ethers of glycol, glycerol, pentacrythritol, resorcinol and the monothio or dithio derivatives of glycols.

Preferred crosslinking monomers include polyvinyl aromatic hydrocarbons, such as divinylbenzene and trivinylbenzene and polyvinyl ethers of polyhydric alcohols, such as ethylene glycol divinylether, glycerol trivinylether and diethyleneglycol divinylether. The amount of crosslinking agent can be varied widely but since the total potential capacity of the final resin as an anion-exchange resin decreases with an increase in the amount of crosslinking agent, an amount of about 2% to about 20%, and preferably about 3 to 10%, on a molar basis is usually adequate.

In some cases it may be desirable to copolymerize additional mono-unsaturated monomers along with the acrolein or methacrolein and the crosslinking agent to impart special properties on the resin. When such additional monounsaturated monomer is copolymerized the amount used should not exceed about 30% of the total monomers by weight. Examples of suitable mono-unsaturated comonomers are methyl acrylate, ethyl acrylate, butyl acrylate, methyl methacrylate, butyl methacrylate, styrene, ethyl styrene, t-butyl-styrene chlorostyrene, vinyl acetate, vinyl propionate, methylvinyl ketone, vinyl chloride, vinyl bromide, ethylvinyl ether, butylvinyl ether and the like.

The physical structure of the copolymer may be varied widely and this will result in similar variation of the physical structure of the resultant anion exchange resins. The modification of the physical structure is usually accomplished by carrying out the polymerization in the presence of a solvent. This solvent is a liquid which is a solvent for the monomer mixture and is chemically inert under the polymerization conditions. In some cases the solvent chosen may be a so-called precipitating solvent, i.e. one which is present in such amount and which exerts so little solvating action on the product crosslinked copolymer that phase separation of the product copolymer takes place as evidenced by the fact that the product copolymer is no more than semi-transparent and is preferably opaque when associated with a fluid having a different refractive index. This opacity is due to voids or channels within the copolymer and may often be desirable.

In specific cases, such as Example 1, the macroreticularity will be evident even without the purposeful addition of any solvent to the monomer mixture. The cause of this phenomenon is not known as a certainty, but it may be due to the inherent insolubility of crosslinked polyacrolein in the monomer mixture.

The weak base resins of this invention are prepared by reaction of the crosslinked aldehyde functional polymer with formic acid and an amine. The amine may be ammonia or it may be a primary or secondary amine. The most preferred amines are the secondary amines since these yield weak base resins with a tertiary amine structure. Examples of primary amines which may be used in the practice of this invention are methylamine, ethylamine, isopropylamine, butylamine, benzylamine, aniline, p-chlorobenzylamine and the like. Examples of the preferred secondary amines are diethylamine, N-methylaniline and the like. The most preferred amine is dimethylamine, since the tertiary amine formed in this case has the highest theoretical anion exchange capacity.

The reaction of the aldehyde functional polymer with the amine and formic acid is advantageously conducted in the presence of a solvent for the amine and formic acid. Examples of solvents which are effective are alcohols such as methanol, ethanol, butanol and 2-ethylhexyl alcohol; amines such as dimethylformamide and N-methylpyrrolidone; sulfur containing solvents such as dimethylsulfoxide and sulfolane, nitroparaffins such as nitroethane and 2-nitropropane; ketones such as diethylketone and dibutylketone and ethers such as ethyleneglycol dimethyl ether.

Depending on the amine and solvent used and on the nature of the aldehyde containing polymer the reaction may be conducted over a wide temperautre range from well below room temperature to 150 to 200° C. and higher. At the higher temperature, pressure may be required to contain the reactants. The preferred temperature range for the reaction is from 0° C. to 150° C.

Water is formed during the reaction and it is often desirable to remove this water by azeotropic distillation to increase the yield or extent of the reaction. Thus, solvents which are not miscible with water and form an azeotrope with it are to be preferred.

The weak base resins of this invention have weak base capacities up to about 6.0 meq./gm. dry or greater. They have column capacities of 22 kilograins of mineral acid per cubic foot or higher. They have excellent physical stability, good rinse requirements, and are resistant to oxidative degradation.

The weak base resins of this invention are useful in all of the well known applications of weak base ion exchange resins. For example, they find utility in the removal of mineral acids from water, the decolorization of sugar and corn syrup and in the purification of dye waste.

Besides being useful in their own right as ion exchange resins and adsorbents, the weak base resins of this invention are particularly useful in that they may be converted by reaction with alkyl halides, sulfates and other alkylating agents into quaternary resins of high utility.

This alkylation reaction is carried out by contacting the alkylating reagent with the crosslinked amine resin. This is usually done in the presence of a suitable solvent, the only requirement for such a solvent being that it be relatively unreactive toward the alkylating reagent and be of such a nature that it will promote the alkylation reaction. Water is the preferred solvent in many cases because it is inexpensive and readily available. However, other solvents such as alcohols, esters, amides, ethers, ketones and nitroparaffins may be advantageously employed. Typical alkylating agents which may be employed are alkyl halides, such as methyl chloride, butyl chloride, butyl bromide, butyl iodide and the like; alkyl sulfates, such as methyl sulfate, ethyl sulfate, benzyl sulfate and the like and oxonium compounds such as trimethyloxonium fluoborate may be used. Hydroxyalkylating agents such as ethylene oxide may also be used. Preferred alkylating agents are the alkyl halides and the most preferred is methyl chloride since it is inexpensive, reacts readily and yields a product of the highest theoretical anion exchange capacity. Thus X as in the Formula I above may be any of the anions associated with these alkylating agents, for example chloride, bromide, iodide, fluoborate, etc. or any other anion which may be exchange with these.

The alkylation reaction may be carried out over a wide temperature range of from well below room temperature to 150 to 200° C. or above. The preferred range is from room temperature to 150° C.

Both the weak and strong base resins of this invention possess an important combination of properties which make them superior over the resins of the prior art.

Because each of the repeating units is of relatively low molecular weight the resins of this invention have relatively high anion exchange capacity. The efficiency of utilization of this capacity in column operation is also good, resulting in high practical column capacities.

The resins of this invention also possess an exceptional ability to adsorb and desorb large or relatively large organic ions. This makes them particularly useful in special applications such as the decolorization of sugar (sugar color bodies are large organic ions) and the purification of dye wastes. This ability to adsorb and desorb large organic ions also gives these resins a special utility in general water treatment. Most natural waters contain substantial amounts of dissolved organic ions resulting from the decomposition of organic matter in the water. These organic ions are adsorbed by the anion exchange resins during use and, in the case of the most commonly used resins of the prior art, not released during regeneration. Thus, the organic ions accumulate within the pores of the resin filling them eventually impeding the exchange of inorganic ions. Such resins are said to be organically fouled and their utility is greatly diminished. When the fouling becomes severe the resin must be discarded.

Because of their ability to desorb the large organic ions the resins of the present invention are more resistant to fouling and their useful life is greatly increased when treating water of high organic content.

The strong base resins of this invention also possess a decided advantage in resistance to thermal degradation when compared to other resins with a high resistance to organic fouling. Resins with an amide quaternary ammonium structure, i.e. possessing repeating units of the formula

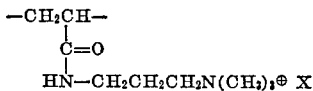

are known to be relatively resistant to organic fouling; however, they are thermally unstable, particularly at elevated temperatures in the hydroxide form, and loose their strong base capacity readily. Thus, while these resins may show the promise of a long life based on their intrinsic organic fouling resistance this promise is not fulfilled because they degrade under use conditions and lose their strong base ion exchange capacity.

The quaternary resins of the present invention combine the three important properties of high capacity, resistance to organic fouling and resistance to thermal degradation and thus have a substantially longer useful life under practical use conditions than any resin of the prior art.

In the examples and throughout the specification and claims, all parts and percentages are by weight unless otherwise stated.

EXAMPLE 1

Copolymerization and acrolein divinylbenzene and diethyleneglycoldivinylether

An organic phase is prepared by mixing 264.4 g. of acrolein, 29.6 g. of divinylbenzene (assay 81.1% divinylbenzene, 18.9% ethylvinylbenzene), 6.0 g. of diethyleneglycoldivinylether and 9.0 g. of t-butylcyclohexyl peroxydicarbonate. An aqueous phase is prepared by mixing 311 g. of water, 4 drops of concentrated sulfuric acid, 5 g. of polyvinyl imidazoline and 116 g. of sodium chloride. The two phases are mixed in a 1 liter round bottom flask sparged with nitrogen and agitated at 145 r.p.m. with a semi-circular Teflon agitator for 2 minutes. Agitation is then stopped for 2 minutes. This intermittent agitation procedure is repeated for 30 minutes, at which time a stable suspension of droplets has formed. The reactor is fitted with a condenser to prevent loss of acrolein and blanketed with nitrogen. The temperature is raised to 50° C. and held there with intermittent heating and air cooling for 16 hours. The contents are cooled to room temperature, the liquid drained and the resin given three water washes. After the last water wash the resin is drained and 300 ml. of n-butanol is added. The mixture is heated to distill an azeotrope of water and butanol, the condensed layers separated and the butanol returned to the flask. When no more water is obtained distillation is stopped. There remained a slurry or dried copolymer beads suspended in 300 ml. of butanol which is used directly in Example 2 below.

EXAMPLE 2

Preparation of a weak base resin by reductive amination

The butanol slurry of crosslinked polyacrolein from Example 1 is transferred to a 3 liter flask and an additional 1257 g. of n-butanol added. The slurry is cooled to 5° C. and 276 g. of 90% formic acid added slowly while maintaining the temperature below 20° C. A Dry Ice condenser is installed on the flask to avoid losses of dimethylamine. Gaseous dimethylamine is then added over a 2 hour period through a sintered sparge tube below the surface of the liquid while maintaining the temperature below 20° C. After addition of the dimethylamine is complete, the contents of the flask are stirred at 10–20° C. for 1 hour. The temperature is raised to 25° C. and held there for 30 minutes.

The flask is fitted for distillation. The reaction mixture is then heated and the water formed in the reaction removed by azeotropic distillation, returning the butanol layer to the flask. This procedure is continued for 16 hours. The contents of the flask is cooled to room temperature, the liquid drained and the resin given four water washes. The residual butanol in the resin is then removed by azeotropic distillation with water. A total of 81 g. of n-butanol are removed over 3 hours of distillation. There is obtained 792 g. of resin beads with the following properties.

Solids _____ percent__ 35.8
Nitrogen _____ do____ 7.38
Anion exchange capacity _____ meq./gm__ 5.31

EXAMPLE 3

Alkylation of the weak base resin with methyl chloride

Five hundred grams of the weak base resin prepared according to Example 2 is placed in a Parr stirring autoclave and sufficient water to form a slurry added followed by 5 g. of sodium carbonate and 1 g. of potassium iodide. The autoclave is sealed and evacuated with a water aspirator. Methyl chloride is admitted through a dip tube extending below the surface of the resin slurry. Pressure is regulated at 55 p.s.i.g., and methyl chloride admitted at such a rate as to maintain this pressure for 17 hours. The autoclave is vented and the contents sparged with nitrogen to remove excess methyl chloride.

The resin is drained and washed twice with water. The yield is 548 g. with the following analysis.

Anion exchange capacity _____ meq./g__ 4.7
Solids _____ percent__ 35.2
Porosity _____ cc./gm__ 0.73

The column capacity of this resin is determined as follows. Regeneration is carried out with the equivalent of 4 lbs. of NaOH per ft.$^3$ of resin at 120° F. and 0.25 gal./min./ft.$^3$ flow rate. Exhaustion is at a rate of 2 gal./ft.$^3$/min. using an influent water containing 300 p.p.m. HCl, 40 p.p.m. $CO_2$ and 20 p.p.m. of $SiO_2$. The capacity was 12.7 kgr./ft.$^3$ expressed as $CaCO_3$.

The resistance of the resin to thermal degradation is determined as follows:

The resin is cycled and then contacted with 1 N NaOH at 50° C. for 3 weeks. Initially, the true strong base capacity of the resin is 3.55 meq./g. After 3 weeks it was 3.49 meq./g.

The organic fouling resistance of the resin is determined as follows: The resin is exhausted with water containing 200 p.p.m. fulvic acid and 1000 p.p.m. HCl and then regenerated at 120° F. and a 0.25 gal./ft.$^3$/min. flow rate with the equivalent of 8 lbs. of NaOH per ft.$^3$ of resin. This exhaustion regeneration cycle is repeated 7 times and the desorption of fulvic acid determined on the seventh cycle. 75% is desorbed.

For comparative purposes the above series of three tests were conducted on a commercially available styrene based macroreticular resin (Resin A) and a commercially available macroreticular resin and amide quaternary ammonium functionality (Resin B). The results are given in Table I and illustrate the overall superiority of the resin of Example 3 (Resin C).

TABLE I.—RESIN PROPERTIES

| | Resin A, porous styrene based | Resin B, porous amide quaternary ammonium | Resin C, resin of present invention |
|---|---|---|---|
| Column capacity, kg./ft.$^3$ | 8.4 | 10.8 | 12.7 |
| Thermal stability, percent loss of true strong base capacity in 3 weeks at 50° C. in 1 N NaOH | 2 | 23.3 | 1.1 |
| Organic fouling resistance, percent regeneration of fulvic acid, 7th cycle | 20 | 50 | 75 |

EXAMPLE 4

Copolymerization of acrolein and divinylbenzene in the presence of toluene

Polyvinylimidazoline (10.5 g., 1.5%) is dissolved in water (1050 g.) by stirring for 6 hours. Sodium chloride (330 g.) is added and the mixture heated to effect solution. On cooling, sodium nitrite (3.5 g., 0.5%) is dissolved. Sodium chloride (57 g.) is added and the mixture sparged with nitrogen for 15 minutes. A solution of distilled acrolein (573.9 g.) divinylbenzene (126.9 g.; 82.8% DVB; 10% crosslinker), toluene (350.1 g.; 33% extender) and cyclohexylperoxydicarbonate (10.5 g., 1.5%) is charged. After 30 minutes, a suspension had not formed with intermittent stirring. Sodium nitrite (0.7 g., 0.1%) in water (5 g.) is added. An adequate suspension resulted on further agitation. The reaction is heated at 45–50° C. for 1.5 hours, then at 48–50° C. for 18.5 hours. After heating 3.75 hours, additional water (150 g.) is added to maintain fluidity. On cooling, the beads were washed copiously with water. The beads are dried at ambient temperature for 3 days to give 643 g. (92% conversion) of white opaque beads.

The combustion analyses is:

|  | Percent |
|---|---|
| C | 66.43 |
| H | 7.44 |

The resin has the following pore size distribution:

| Pore size range: | Distribution (percent) |
|---|---|
| Larger than 100,000 | 10.63 |
| 100,000 to 10,000 | 2.21 |
| 10,000 to 1,000 | 10.63 |
| Less than 1,000 | 76.59 |

The total porosity is 0.46 cc./g.

EXAMPLE 5

Reduction of toluene extended poly(acrolein:divinylbenzene)

In a round bottom flask equipped with stirrer, dropping funnel, thermometer, cold finger condenser filled with Dry Ice-acetone, the resin from Example 4 (150 g., 2.68 moles) is slurried in dimethylformamide (600 ml.). The mixture is cooled in an ice bath. Formic acid (90%; 685 g.; 616 g. or 13.4 moles acid; 5 equivalents) is added at such a rate that the temperature does not exceed 10° C. Maintaining the temperature below 20° C., dimethylamine (720 g., 16 moles, 6 equivalents) is added. The mixture is stirred at ice bath temperature for 15 minutes and at ambient temperature for 15 minutes. The Dry Ice-acetone condenser is replaced by a distilling head-water condenser. The reaction is heated and distillate collected till a pot temperature of 135° C. attained. The reaction is refluxed for 24 hours. Distillation is continued till a pot temperature of 150° C. attained. After refluxing 20.5 hours, the beads are washed with water till the wash is neutral. The beads are stirred in aqueous hydrochloric acid (10%) for 1 hour, then water washed till neutral.

After stirring in aqueous sodium hydroxide (5%) for 1 hour, the product is backwashed till the effluent is neutral.

The resulting weak base anion exchange resin has the following properties:

Percent N=8.9
Anion exchange capacity=6.33 meq.*/g. dry
Carboxyl=0.83 meq./g. dry
Percent solids=30.3

*Meq.=milliequivalents.

The size of the resin is:

| Mesh: | Percent through |
|---|---|
| 16 | 0.0 |
| 20 | 0.0 |
| 30 | 6.25 |
| 40 | 56.25 |
| 50 | 91.83 |
| 325 | 100.00 |

Column cap.:
23 kgr./ft.³ at saturation
21.5 kgr./ft.³ at 4 lb. regeneration
2 gal. flow rate.

The term "lower alkyl" is understood to include alkyl groups of 1 to 4 carbon atoms.

We claim:

1. A crosslinked polymeric anion exchange resin having a plurality of aliphatic functional groups of the structure

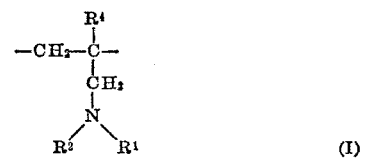

wherein $R^1$ and $R^2$ are hydrogen, lower alkyl, or hydroxy lower alkyl, and $R^4$ is H or —$CH_3$ produced by treating a crosslinked copolymer of acrolein or methacrolein with from about 2% to about 20% of a polyunsaturated monomer with formic acid and an amine.

2. A crosslinked polymeric anion exchange resin having a plurality of functional groups of the structure

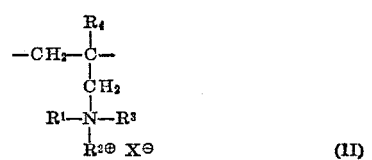

wherein $R^1$, $R^2$ and $R^3$ are hydrogen, lower alkyl, or hydroxy lower alkyl; $R^4$ is H— or $CH_3$ and $X^\ominus$ is any anion produced by treating a crosslinked copolymer of acrolein or methacrolein with from about 2% to about 20% of a polyunsaturated monomer with formic acid and an amine followed by alkylation with an alkylating agent.

3. A composition according to claim 1 in which $R^1$ and $R^2$ are lower alkyl and $R^4$ is H or $CH_3$.

4. A composition according to claim 1 in which $R^1$ and $R^2$ are $CH_3$ and $R^4$ is H.

5. A composition according to claim 4 in which at least part of the polyunsaturated monomer is a polyvinylaromatic compound.

6. A composition according to claim 4 in which the polyunsaturated monomer is a mixture of a polyvinylaromatic compound and a polyvinylether.

7. A composition according to claim 2 in which $R^1$, $R^2$ and $R^3$ are lower alkyl; $R^4$ is H or $CH_3$ and $X^\ominus$ is any anion.

8. A composition according to claim 2 wherein $R^1$, $R^2$ and $R^3$ are $CH_3$; $R^4$ is H and $X^\ominus$ is any anion.

9. A composition according to claim 8 in which at least part of the polyunsaturated monomer is a polyvinylaromatic compound.

10. A composition according to claim 8 in which the polyunsaturated monomer is a mixture of a polyvinyl aromatic compound and a polyvinyl ether.

11. A process for the preparation of a weak base anion exchange resin which comprises copolymerizing acrolein or methacrolein with a polyunsaturated monomer to form a cross-linked copolymer and then reductively aminating this copolymer with formic acid and an amine.

12. A process for preparation of a quaternary anion exchange resin which comprises copolymerizing acrolein or methacrolein with a polyunsaturated monomer to form a cross-linked copolymer, reductively aminating this copolymer with formic acid and an amine to form a weak base anion exchange resin, and then alkylating this weak base resin with an alkylating agent.

13. A process according to claim 11 in which the polyunsaturated monomer is at least partly a polyvinyl aromatic hydrocarbon and the amine is dimethylamine.

14. A process according to claim 12 in which the polyunsaturated monomer is at least partly a polyvinyl aromatic hydrocarbon, the amine is dimethylamine and the alkylating agent is methyl chloride or methyl sulfate.

References Cited
UNITED STATES PATENTS

| | | |
|---|---|---|
| 3,121,700 | 2/1964 | Bergman. |
| 3,148,165 | 9/1964 | Kalafus et al. |
| 3,177,171 | 4/1965 | Gruber et al. |
| 3,234,164 | 2/1966 | Kern et al. |

MELVIN GOLDSTEIN, Primary Examiner

U.S. Cl. X.R.

260—2.1 E, 67 UA

UNITED STATES PATENT OFFICE
CERTIFICATE OF CORRECTION

Patent No. 3,813,353   Dated May 28, 1974

Inventor(s) David H. Clemens and Raymond J. Lange

It is certified that error appears in the above-identified patent and that said Letters Patent are hereby corrected as shown below:

IN THE SPECIFICATION:

Col. 4, line 43, "exchange" should read --exchanged--.

Col. 5, line 18, "loose" should read --lose--.

Col. 1, line 22, "equilvalent" should read --equivalent-- .

Col. 2, line 8, "witth" should read --with-- .

Col. 2, line 28, "oxonides" should read --ozonides-- .

Col. 2, line 52, "silcate" should read --silicate-- .

Col. 2, lines 53-54, "N,N'-ethylenedicrylamide" should read --N,N'-ethylenediacrylamide-- .

Col. 3, line 62, after "as" and before "nitroethane", insert the word --nitromethane-- .

Col. 3, line 68, "temperautre" should read --temperature-- .

Col. 5, line 59, "or" should read --of-- .

Col. 6, line 71, under Table I, "kg./ft.$^3$" should read --kgr./ft.$^3$-- .

Col. 8, line 29, in Claim 1, "R4" should read --$R^4$-- .

Col. 8, line 36, in Claim 2, "$R_4$" (shown in formula) should read --$R^4$-- .

Signed and sealed this 29th day of October 1974.

(SEAL)
Attest:

McCOY M. GIBSON JR.
Attesting Officer

C. MARSHALL DANN
Commissioner of Patents